United States Patent
Li et al.

(10) Patent No.: US 11,888,529 B2
(45) Date of Patent: Jan. 30, 2024

(54) COHERENT TRANSMITTER, METHOD FOR CONTROLLING COHERENT TRANSMITTER, AND COHERENT TRANSCEIVER SYSTEM

(71) Applicant: Huawei Technologies Co., Ltd., Shenzhen (CN)

(72) Inventors: Rui Li, Shenzhen (CN); Xu Sun, Shenzhen (CN); Xiaolu Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1 day.

(21) Appl. No.: 17/865,835

(22) Filed: Jul. 15, 2022

(65) Prior Publication Data
US 2022/0352988 A1    Nov. 3, 2022

Related U.S. Application Data

(63) Continuation of application No. PCT/CN2020/115479, filed on Sep. 16, 2020.

(30) Foreign Application Priority Data

Jan. 17, 2020 (CN) .................. 202010057408.8

(51) Int. Cl.
  *H04B 10/04* (2006.01)
  *H04B 10/556* (2013.01)
  *H04B 10/40* (2013.01)

(52) U.S. Cl.
  CPC .......... *H04B 10/556* (2013.01); *H04B 10/40* (2013.01)

(58) Field of Classification Search
  CPC .... H04B 10/556; H04B 10/40; H04B 10/548; H04B 10/532; H04B 10/516;
  (Continued)

(56) References Cited

U.S. PATENT DOCUMENTS

| 8,059,970 | B2 | 11/2011 | Harley et al. |
| 8,364,038 | B2 * | 1/2013 | Mizuguchi ......... H04B 10/5053 398/198 |

(Continued)

FOREIGN PATENT DOCUMENTS

| CN | 106549714 A | 3/2017 |
| CN | 104485997 B | 4/2017 |

(Continued)

OTHER PUBLICATIONS

Chen Sun et al.,. "Single chip microprocessor that communicates directly using light," Dec. 31, 2015, 11 pages.
(Continued)

*Primary Examiner* — Hanh Phan
(74) *Attorney, Agent, or Firm* — Conley Rose, P.C.

(57) ABSTRACT

A coherent transmitter includes a first beam splitter that splits an input first optical signal to obtain a second optical signal and a third optical signal, a first modulator that modulates the second optical signal to obtain a first modulated signal, a phase shift adjustment unit that adjusts a phase of a first sub-signal in the first modulated signal and adjusts a phase of a fourth sub-signal in the phase-adjusted first sub-signal, a first beam combiner that combines a second sub-signal in the first modulated signal and the phase-adjusted fourth sub-signal to obtain a first combined signal, a first PD that performs optical-to-electrical conversion on the first combined signal to obtain a first electrical signal, and a controller that controls, based on the first electrical signal, a voltage applied to the phase shift adjustment unit.

20 Claims, 7 Drawing Sheets

(58) Field of Classification Search
CPC ............. H04B 10/564; H04B 10/5561; H04B 10/5057; H04B 10/50577; H04B 10/50597; H04B 10/2507; H04B 10/0795; H04B 10/58; H04J 14/06
USPC ....... 398/183, 188, 184, 185, 186, 187, 192, 398/193, 194, 195, 196, 197, 198, 199, 398/33, 38, 135, 136, 137, 138, 139, 79, 398/65, 152, 202, 208, 209
See application file for complete search history.

(56) References Cited

U.S. PATENT DOCUMENTS

| | | | |
|---|---|---|---|
| 8,472,810 B2 * | 6/2013 | Akiyama | H04B 10/50575 398/198 |
| 9,059,805 B2 | 6/2015 | Mak et al. | |
| 9,853,734 B1 | 12/2017 | Fan | |
| 10,754,091 B1 | 8/2020 | Nagarajan | |
| 2009/0141333 A1 | 6/2009 | Tsunoda et al. | |

FOREIGN PATENT DOCUMENTS

| | | |
|---|---|---|
| CN | 105075153 B | 5/2018 |
| CN | 108370273 A | 8/2018 |
| CN | 110190953 A | 8/2019 |
| CN | 110351075 A | 10/2019 |
| CN | 110635895 A | 12/2019 |
| CN | 110649977 A | 1/2020 |
| WO | 2015176527 A1 | 11/2015 |
| WO | 2017177372 A1 | 10/2017 |
| WO | 2019100694 A1 | 5/2019 |

OTHER PUBLICATIONS

Po Dong et al., "Monolithic Silicon Photonic Integrated Circuits for Compact 100+GB/s Coherent Optical Receivers and Transmitters," IEEE Journal of Selected Topics in Quantum Electronics, vol. 20, No. 4, Jul./Aug. 2014, 8 pages.

C. Doerr, J. Heanue et al., "Silicon Photonics Coherent Transceiver in a Ball-Grid Array Package," OSA 2017, 3 pages.

S. Wolf et al., "Coherent modulation up to 100 GBd 16QAM using silicon-organic hybrid (SOH) devices," Jan. 8, 2018, 13 pages.

* cited by examiner

COHERENT TRANSMITTER, METHOD FOR CONTROLLING COHERENT TRANSMITTER, AND COHERENT TRANSCEIVER SYSTEM

CROSS-REFERENCE TO RELATED APPLICATIONS

This is a continuation of International Patent Application No. PCT/CN2020/115479 filed on Sep. 16, 2020, which claims priority to Chinese Patent Application No. 202010057408.8 filed on Jan. 17, 2020. The disclosures of the aforementioned applications are hereby incorporated by reference in their entireties.

TECHNICAL FIELD

This application relates to the field of optical communication, and in particular, to a coherent transmitter, a method for controlling a coherent transmitter, and a coherent transceiver system.

BACKGROUND

In recent years, with a rapid increase in an information exchange amount between an inner side of a data center and the data center, a direct modulation mode is limited by component bandwidth, and a requirement of 200 gigahertz (G) on a single-wavelength or even 400 G on a single wavelength cannot be met. A coherent modulation mode is favored due to high spectral efficiency and a high single-wavelength modulation rate, and is gradually applied to a short-distance optical transmission system.

In coherent modulation, 900 phase shift needs to be implemented between in-phase and quadrature (I/Q) signals. A common design is implementing 90° phase shift by applying a certain voltage to a heater of an integrated chip. However, in a modulation process of a signal, there may be deviation for 90° phase shift due to instability of the heater, and consequently, quality of a modulated coherent signal deteriorates.

SUMMARY

A coherent transmitter, a method for controlling a coherent transmitter, and a coherent transceiver system are provided in embodiments of this application.

According to a first aspect, a coherent transmitter is provided in an embodiment of this application. The coherent transmitter includes a first signal modulation module, a first photodiode (PD), and a controller. The first signal modulation module, the first PD, and the controller are connected to each other. The first signal modulation module includes a first modulator, a second modulator, a first beam splitter, a phase shift adjustment unit, a first beam combiner, and a second beam combiner. Specifically, the first beam splitter splits an input first optical signal to obtain a second optical signal and a third optical signal. The first modulator modulates the second optical signal to obtain a first modulated signal. The second modulator modulates the third optical signal to obtain a second modulated signal. The phase shift adjustment unit adjusts a phase of a first sub-signal in the first modulated signal, and adjusts a phase of a fourth sub-signal in the phase-adjusted first sub-signal. The first beam combiner combines a second sub-signal in the first modulated signal and the phase-adjusted fourth sub-signal to obtain a first combined signal. The second beam combiner combines a third sub-signal in the phase-adjusted first sub-signal and the second modulated signal to obtain a second combined signal. The first PD performs optical-to-electrical conversion on the first combined signal to obtain a first electrical signal. The controller controls, based on the first electrical signal, a voltage applied to the phase shift adjustment unit, so that a first phase difference falls within a preset range.

According to a second aspect, a method for controlling a coherent transmitter is provided in an embodiment of this application. The coherent transmitter includes a first signal modulation module, a first PD, and a controller. The first signal modulation module, the first PD, and the controller are connected to each other. The first signal modulation module includes a first modulator, a second modulator, a first beam splitter, a phase shift adjustment unit, a first beam combiner, and a second beam combiner. The method includes splitting, by using the first beam splitter, an input first optical signal to obtain a second optical signal and a third optical signal; modulating the second optical signal by using the first modulator to obtain a first modulated signal, and modulating the third optical signal by using the second modulator to obtain a second modulated signal, where the first modulated signal and the second modulated signal have a same phase; adjusting, by using the phase shift adjustment unit, a phase of a first sub-signal in the first modulated signal, and adjusting a phase of a fourth sub-signal in the phase-adjusted first sub-signal, where there is a first phase difference between the phase-adjusted first sub-signal and the first modulated signal, there is a second phase difference between the phase-adjusted fourth sub-signal and the first modulated signal, and the second phase difference is twice as large as the first phase difference; combining, by using the first beam combiner, a second sub-signal in the first modulated signal and the phase-adjusted fourth sub-signal to obtain a first combined signal; combining, by using the second beam combiner, a third sub-signal in the phase-adjusted first sub-signal and the second modulated signal to obtain a second combined signal; performing, by using the first PD, optical-to-electrical conversion on the first combined signal to obtain a first electrical signal; and controlling, by using the controller and based on the first electrical signal, a voltage applied to the phase shift adjustment unit, so that the first phase difference between the phase-adjusted first sub-signal and the first modulated signal falls within a preset range.

According to a third aspect, a coherent transceiver system is provided in an embodiment of this application, and includes a light source, a coherent receiver, and the coherent transmitter according to any implementation of the first aspect. Specifically, the light source is configured to output an optical signal. The coherent transmitter is configured to output a modulated signal. The coherent receiver is configured to mix the optical signal and the modulated signal, and demodulate a mixed signal.

According to a fourth aspect, a coherent transmitter is provided in an embodiment of this application. The coherent transmitter includes a first signal modulation module, a first PD, and a controller. The first signal modulation module, the first PD, and the controller are connected to each other. The first signal modulation module includes a first modulator, a second modulator, a first beam splitter, a phase shifter, a second beam splitter, a third beam splitter, a first beam combiner, and a second beam combiner. Specifically, the first beam splitter splits an input first optical signal to obtain a second optical signal and a third optical signal. The first modulator modulates the second optical signal to obtain a first modulated signal. The second modulator modulates the third optical signal to obtain a second modulated signal, and the first modulated signal and the second modulated signal have a same phase. The second beam splitter splits the first modulated signal to obtain a first sub-signal and a second sub-signal. The phase shifter adjusts a phase of the first sub-signal, and there is a first phase difference between the phase-adjusted first sub-signal and the first modulated signal. The third beam splitter splits the phase-adjusted first sub-signal to obtain a third sub-signal and a fourth sub-signal. The phase shifter then adjusts a phase of the fourth sub-signal. There is a second phase difference between the phase-adjusted fourth sub-signal and the first modulated signal, and the second phase difference is twice as large as the first phase difference. The first beam combiner combines a second sub-signal in the first modulated signal and the phase-adjusted fourth sub-signal to obtain a first combined signal. The second beam combiner combines a third sub-signal in the phase-adjusted first sub-signal and the second modulated signal to obtain a second combined signal. The first PD performs optical-to-electrical conversion on the first combined signal to obtain a first electrical signal. The controller controls, based on the first electrical signal, a voltage applied to the phase shift adjustment unit, so that the first phase difference falls within a preset range.

DESCRIPTION OF EMBODIMENTS

Embodiments of this application provide a coherent transmitter, a method for controlling a coherent transmitter, and a coherent transceiver system. A phase difference obtained after phase adjustment may be monitored in real time without affecting service transmission, and the phase difference is controlled within a preset range, so that phase adjustment precision is improved, and quality of a coherent signal in coherent modulation is improved. In addition, complex electrical components such as an analog-to-digital converter (ADC) and a digital-to-analog converter (DAC) do not need to be disposed in a structure of the coherent transmitter, so that integration is facilitated, component costs are lower, and power consumption is lower. In the specification, claims, and accompanying drawings of this application, terms "first", "second", "third", "fourth", and the like (if existent) are intended to distinguish between similar objects but do not necessarily indicate a specific order or sequence. It should be understood that data used in such a way may be interchangeable in appropriate circumstances, so that embodiments described herein can be implemented in an order other than the content illustrated or described herein. In addition, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

Figure 1:
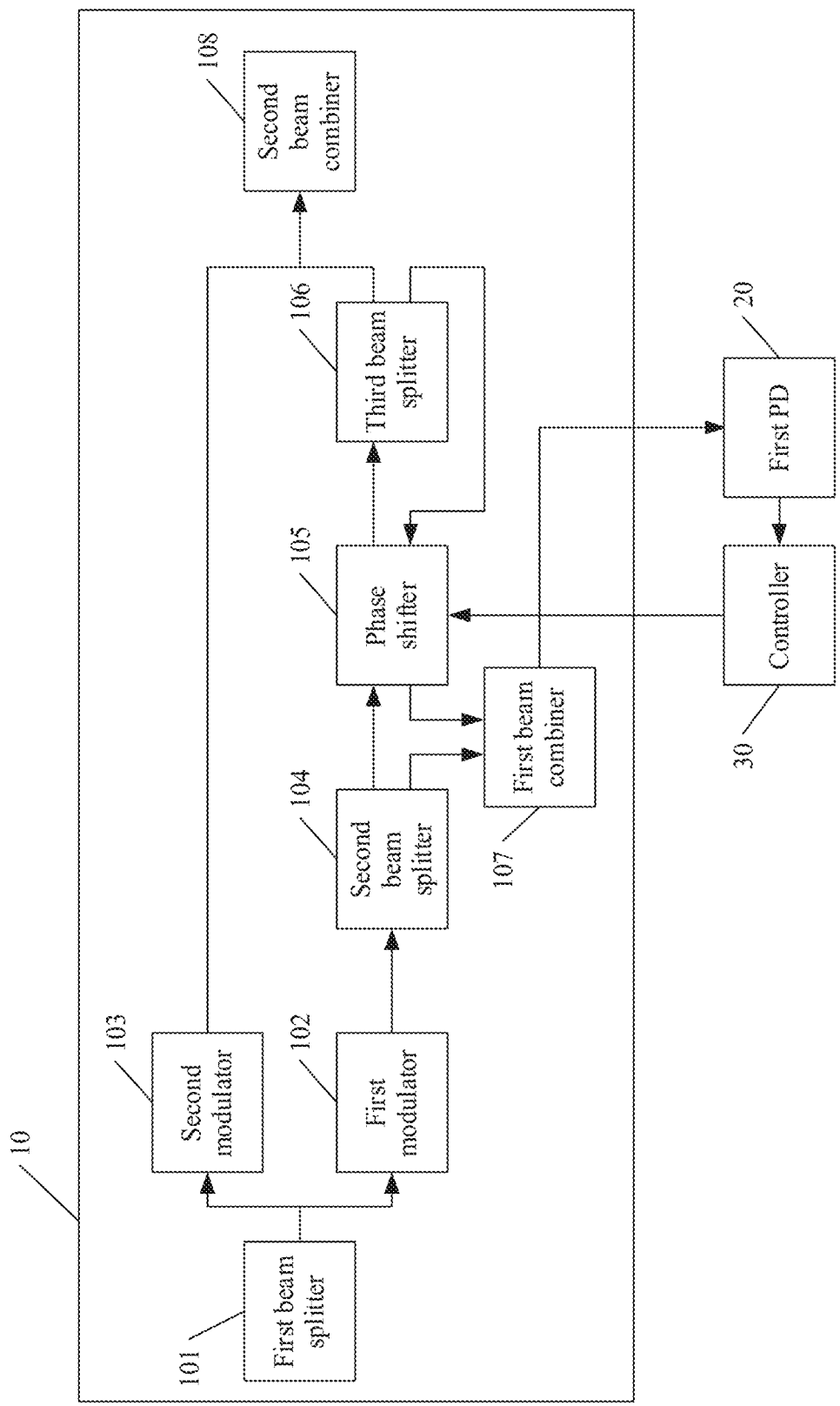
FIG. 1 is a schematic diagram of a structure of a coherent transmitter according to an embodiment of this application.

FIG. 1 is a schematic diagram of a structure of a coherent transmitter according to an embodiment of this application. The coherent transmitter includes a first signal modulation module 10, a first PD 20, and a controller 30. The first signal modulation module 10 includes a first beam splitter 101, a first modulator 102, a second modulator 103, a second beam splitter 104, a phase shifter 105, a third beam splitter 106, a first beam combiner 107, and a second beam combiner 108.

Functions of component parts of the coherent transmitter are separately described below.

The first beam splitter 101 splits an input first optical signal to obtain a second optical signal and a third optical signal. It may be understood that the coherent transmitter needs to split a signal into two channels (an I channel and a Q channel) and separately perform modulation. For instance, the second optical signal is used for modulation on the Q channel, and the third optical signal is used for modulation on the I channel.

The first modulator 102 modulates the second optical signal to obtain a first modulated signal. The second modulator 103 modulates the third optical signal to obtain a second modulated signal. The first modulator 102 and the second modulator 103 have a same structure and a same modulation principle. Specifically, the first modulator 102 and the second modulator 103 separately modulate input optical signals by applying radio frequency driving electrical signals (radio frequency (RF) driving signals) that are independent of each other (the radio frequency driving electrical signals are at a same frequency and clocks are synchronous). It should be noted that if coherent modulation implemented by the coherent transmitter is N2-level quadrature amplitude modulation (N2-QAM), modulation performed by the first modulator 102 and modulation performed by the second modulator 103 are N-level amplitude-shift keying (N-ASK). For example, if the coherent transmitter implements 16-QAM, the first modulated signal and the second modulated signal are mutually independent 4-ASK signals. In addition, the first modulated signal and the second modulated signal have a same phase.

The second beam splitter 104 splits the first modulated signal to obtain a first sub-signal and a second sub-signal. The phase shifter 105 adjusts a phase of the first sub-signal. The third beam splitter 106 splits the phase-adjusted first sub-signal to obtain a third sub-signal and a fourth sub-signal. The phase shifter 105 adjusts a phase of the fourth sub-signal. It should be noted that there is a phase difference between a phase-adjusted signal and a signal whose phase is not adjusted. In a preferred state, the phase difference may be 90°. In other words, there is a first phase difference between the phase-adjusted first sub-signal and the first modulated signal. In this case, the third sub-signal and the fourth sub-signal also have the first phase difference with the first sub-signal. However, there is a second phase difference between the phase-adjusted fourth sub-signal and the first modulated signal, and the second phase difference is twice as large as the first phase difference. For example, if the first phase difference is 90°, the second phase difference is 180°.

In addition, the second beam splitter 104, the phase shifter 105, and the third beam splitter 106 may be integrated into a phase shift adjustment unit.

The second beam combiner 108 combines the third sub-signal and the second modulated signal to obtain a second combined signal and outputs the second combined signal. It may be understood that there is the first phase difference between the third sub-signal and the second modulated signal. If the coherent transmitter implements 16-QAM, the second combined signal obtained by combining two orthogonal 4-ASK signals is a 16-QAM signal.

The first beam combiner 107 combines the second sub-signal and the phase-adjusted fourth sub-signal to obtain a first combined signal. The first PD 20 performs optical-to-electrical conversion on the first combined signal to obtain a first electrical signal. The controller 30 controls, based on the first electrical signal, a voltage applied to the phase shifter 105, to control the first phase difference to fall within a preset range (close to 90°).

Figure 2:
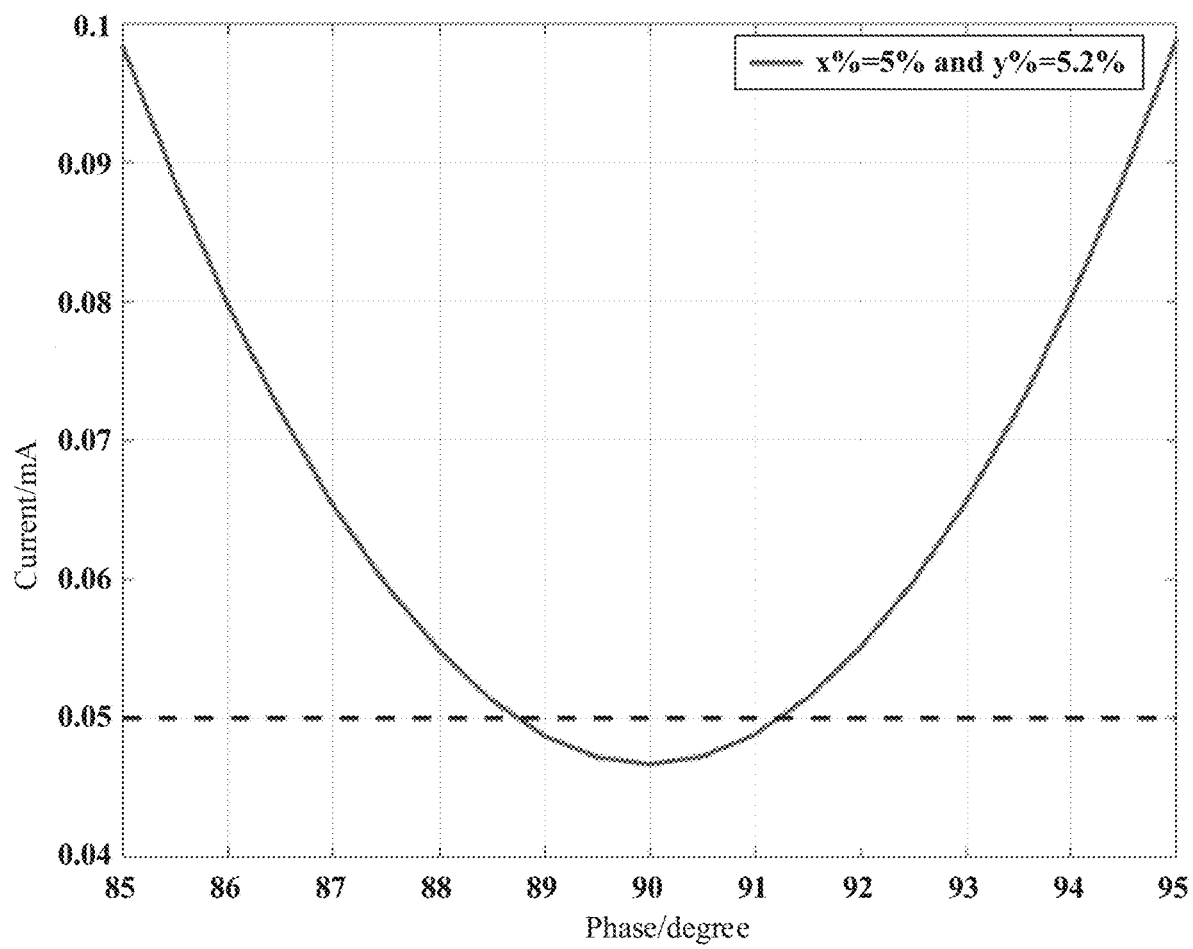
FIG. 2 is a schematic diagram of a simulation relationship between a current generated on a first PD and phase shift.

FIG. 2 is a schematic diagram of a simulation relationship between a current generated on a first PD and phase shift. It can be learned from a simulation result that, when phase shift implemented by the phase shifter 105 is 90°, a current generated on the first PD 20 is the smallest, and a larger degree to which the phase shift deviates from 90° leads to a larger current generated on the first PD 20. Theoretically, if phase shift implemented by the phase shifter 105 is 90° (the first phase difference is 90°), the second phase difference is 180°, and light intensity of the first combined signal obtained after the first beam combiner 107 performs combination is 0 due to interference of light, the current generated by the first PD also needs to be 0. However, for reasons such as uneven splitting or component loss, when the phase shift is 90°, the current on the first PD 20 is not necessarily 0, but may be the smallest. In other words, if the current generated on the first PD 20 is less than a preset value, it can be ensured that the phase shift falls within the preset range (close to 90°). For example, as shown in FIG. 2, a minimum value of a current in phase shift of 90° is approximately 47 microamperes (μA), and a preset current may be set to 50 μA. If a value of the current generated on the first PD is less than 50 μA, the phase shift falls within a preset range of 88.5° to 91.5°, and in this case, quality of a modulated signal falls within an acceptable range. It may be learned from this that the controller 30 may determine, by reading the value of the current generated on the first PD 20, whether the current phase shift falls within the preset range, and if no true, adjust the voltage applied to the phase shifter to control the phase shift to fall within the preset range.

The controller 30 may have a plurality of different control manners. The plurality of different control manners are separately described below.

Manner 1: A correspondence between the voltage applied to the phase shifter 105 and the current on the first PD 20 may be recorded by using an experiment, to obtain a correspondence table. The controller 30 may obtain the correspondence table, and if the value of the current generated on the first PD 20 is greater than a current threshold, the controller 30 determines, based on the correspondence table, a target voltage corresponding to a target current value. The target current value is less than or equal to the current threshold. Further, the controller 30 adjusts the voltage applied to the phase shifter 105 to the target voltage.

Figure 3:
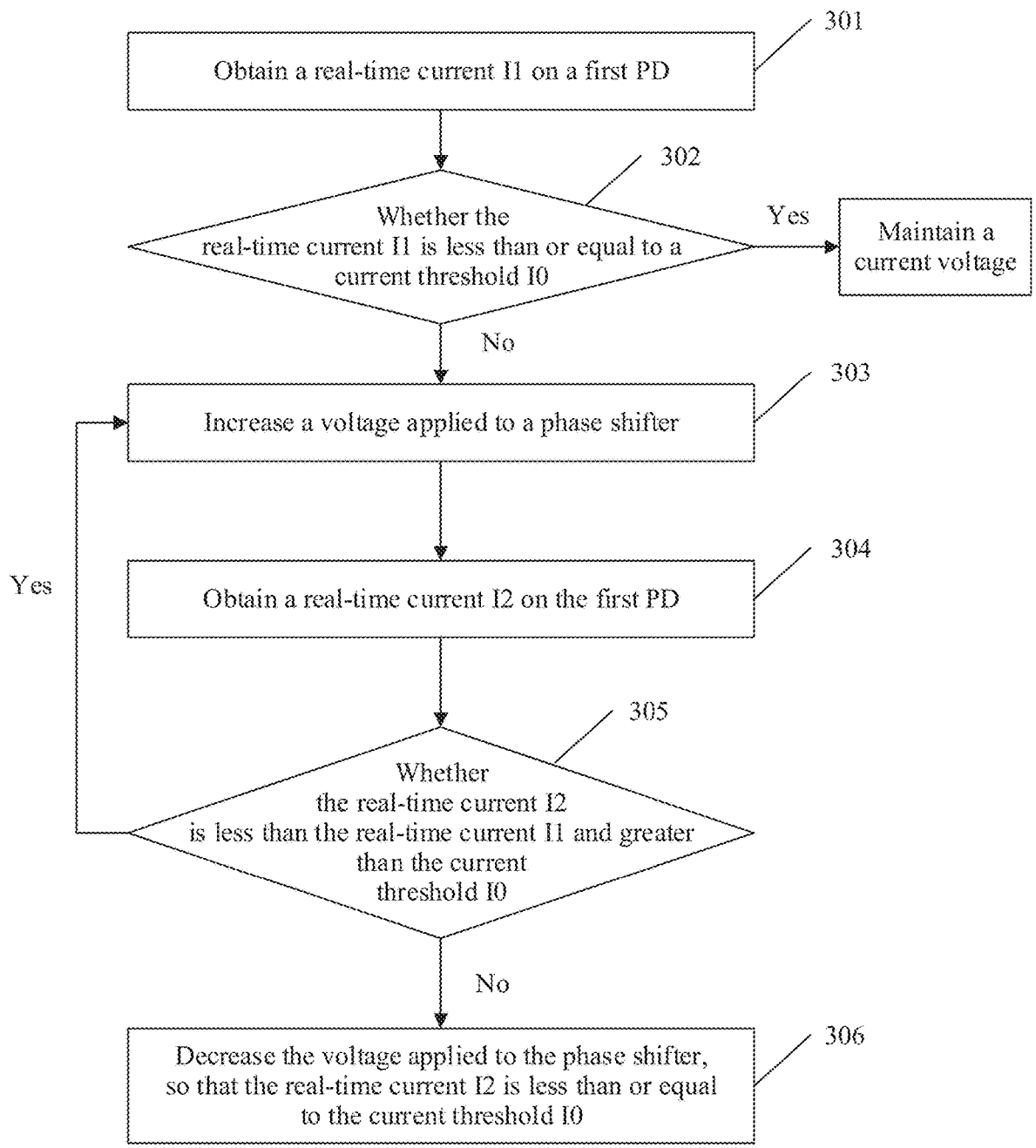
FIG. 3 is a diagram of an operation procedure in which a controller controls a voltage.

Manner 2: The controller adjusts the applied voltage based on a preset operation mechanism. FIG. 3 is a diagram of an operation procedure in which the controller controls a voltage. The operation procedure is described in detail below.

301: Obtain a real-time current I1 on the first PD.

The controller 30 reads a real-time current of the first electrical signal generated by the first PD 20.

302: Determine whether the real-time current I1 is less than or equal to a current threshold I0, and if this is true, maintain a current voltage, or if not true, perform step 303.

303: Increase the voltage applied to the phase shifter.

304: Obtain a real-time current I2 on the first PD.

305: Determine whether the real-time current I2 is less than the real-time current I1 and greater than the current threshold I0, and if this is true, repeatedly perform step 303, so that the real-time current I2 is less than or equal to the current threshold I0, or if not true, perform step 306.

306: Decrease the voltage applied to the phase shifter, so that the real-time current I2 is less than or equal to the current threshold I0.

It should be noted that regardless of whether the phase shift is greater than the preset range or less than the preset range, the real-time current is greater than the current threshold. Therefore, whether the phase shift is large or small is tested by using step 303. If the real-time current starts to decrease after the voltage is increased, it is proved that the real-time current is greater than the current threshold because the phase shift is less than the preset range, and the voltage continues to be increased until the real-time current is less than or equal to the current threshold. If the current still increases after the voltage is increased, it is proved that the real-time current is greater than the current threshold because the phase shift is greater than the preset range, and the voltage needs to be decreased until the real-time current is less than or equal to the current threshold.

Optionally, there may be a plurality of types of the phase shifter 105. For example, the phase shifter 105 may be a heater. There are the following two common manners used by the heater to change a phase. Manner 1: A metal is covered on an optical waveguide, and the metal is heated by applying a voltage to the metal, to change a refractive index of the optical waveguide, so that the phase is changed. Manner 2: Carrier doping is performed on and around an optical waveguide of the modulator (for example, a phosphorus atom is doped on and around a silicon-on-insulator integrated optical waveguide), and carrier concentration in the waveguide is changed by applying a voltage, and a refractive index of the optical waveguide can also be changed, to change the phase. It should be noted that, in addition to the foregoing listed heat heaters, a phase shifter of another type used to adjust the phase falls within the protection scope of this application, and this is not specifically limited herein.

Optionally, to enable the current generated on the first PD 20 to be as small as possible when the phase shift is 90°, power of two channels of light input to the first beam combiner 107 needs to be as close as possible. Specifically, a split ratio between the second beam splitter 104 and the third beam splitter 106 may be set for implementation. A proportion of the second sub-signal in the first modulated signal is a first proportion (x %), and a proportion of the fourth sub-signal in the phase-adjusted first sub-signal is a second proportion (y %). Therefore, the relational formula between the first proportion and the second proportion is (1−x %)×y %=x %. Different split ratio designs may be implemented by changing a length of a waveguide coupling region.

Figure 4:
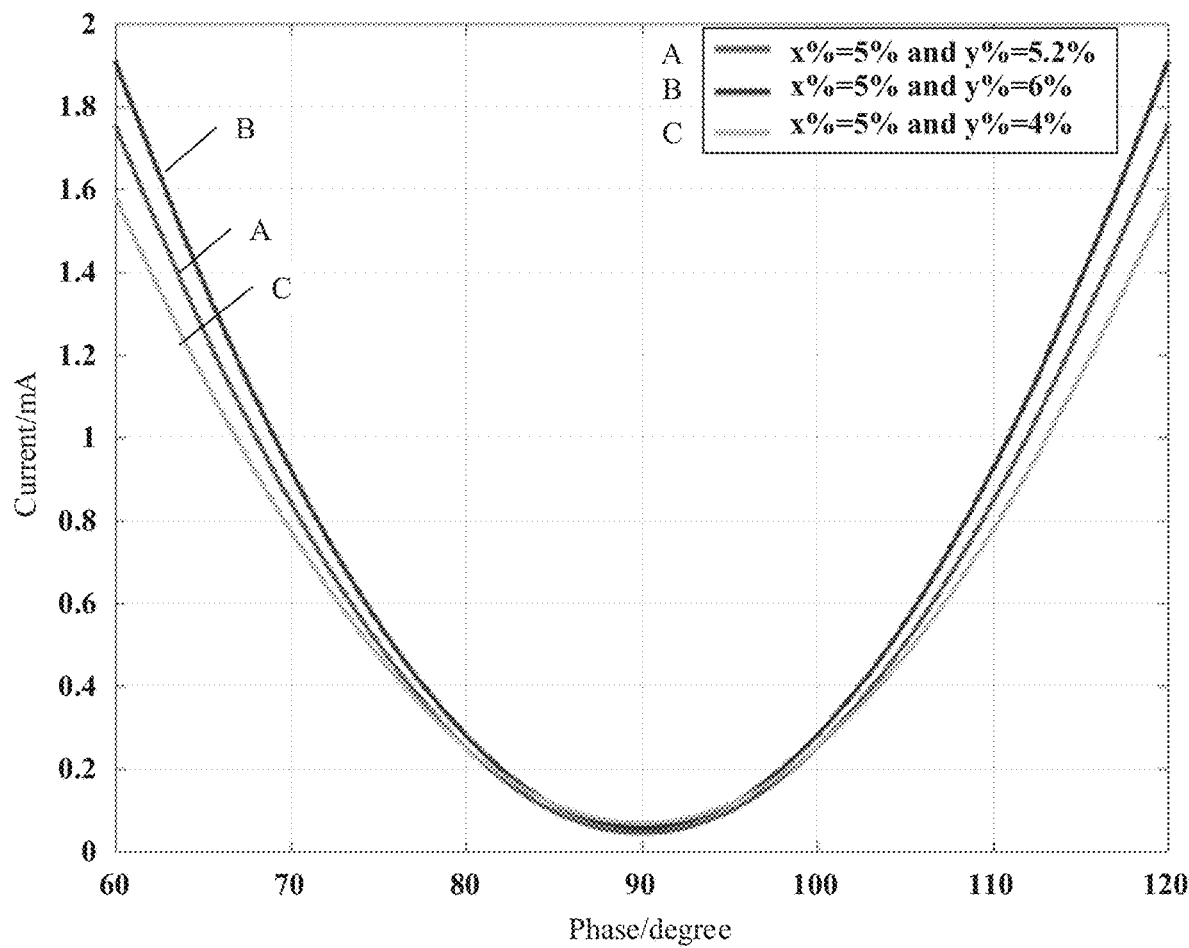
FIG. 4 is a schematic diagram of sizes of currents generated on a first PD that are corresponding to different split ratios.

FIG. 4 is a schematic diagram of sizes of currents generated on the first PD that are corresponding to different split ratios. Based on the foregoing relational formula, if x %=5%, y %=5.2%. It may be learned from FIG. 4 that a current generated on the first PD in a condition of x %=5% and y %=5.2% is the smallest, and is less than a current generated on the first PD in two conditions: x %=5% and y %=6; and x %=5% and y %=4. It should be noted that in actual application, the first proportion and the second proportion may not meet the foregoing relational formula, and this is not specifically limited herein.

Optionally, processing of the coherent transmitter in this embodiment of this application may support a dual-polarization mode in addition to the single-polarization mode shown in FIG. 1. Further descriptions are provided below.

Figure 5:
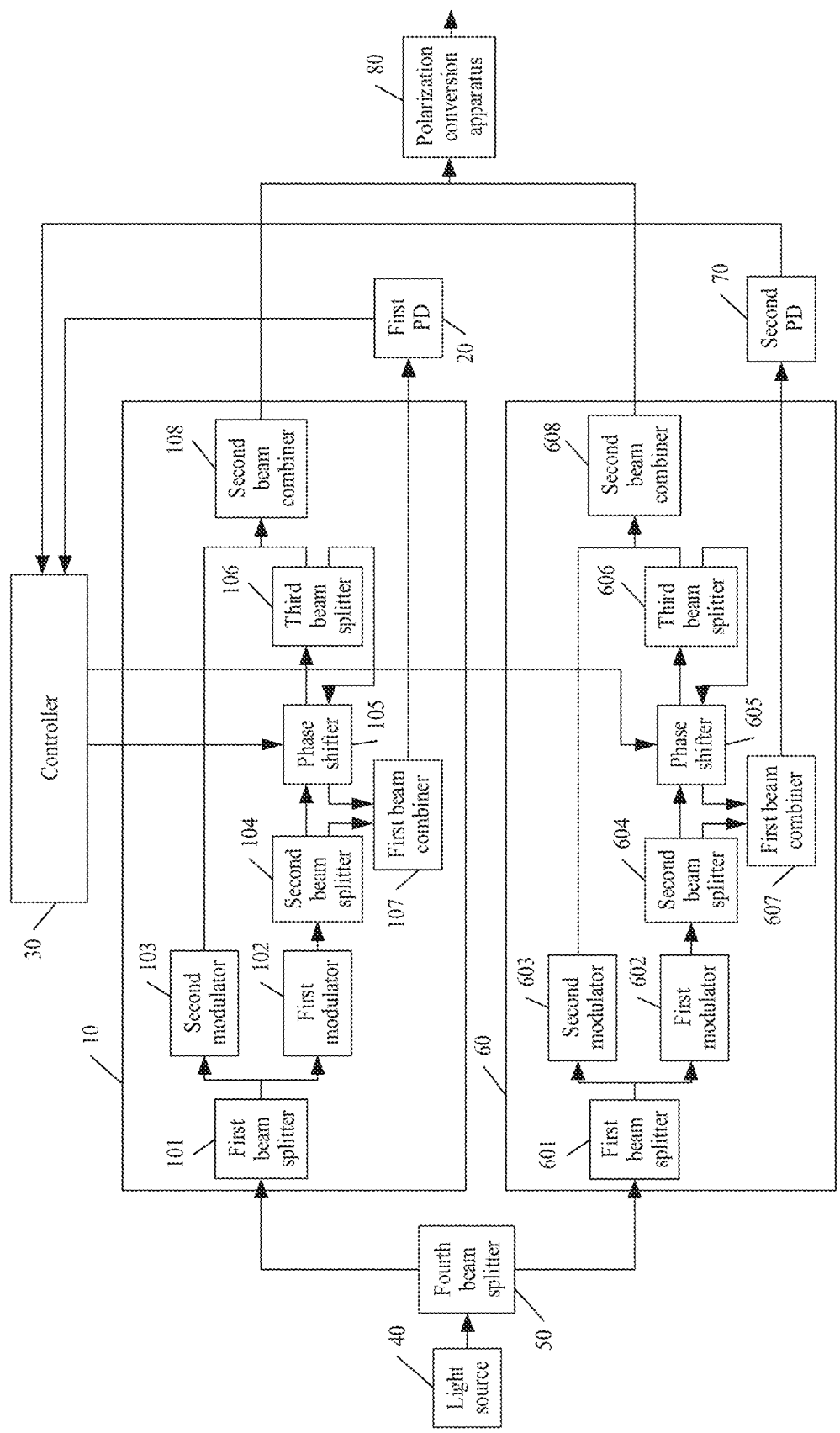
FIG. 5 is a schematic diagram of a structure of another coherent transmitter according to an embodiment of this application.

FIG. 5 is a schematic diagram of a structure of another coherent transmitter according to an embodiment of this application. A main difference from the coherent transmitter shown in FIG. 1 is that the coherent transmitter further includes a second signal modulation module 60 and a polarization conversion apparatus 80, so that the first signal modulation module 10 and the second signal modulation module 60 have different polarization modes. In addition, the coherent transmitter may further include a light source 40, a fourth beam splitter 50, and a second PD 70. The first signal modulation module 10 and the second signal modulation module 60 have a same structure and a same function. Details are not described herein again.

The light source 40 outputs an optical signal. Further, the fourth beam splitter 50 splits the optical signal to obtain a first optical signal and a fourth optical signal, transmits the first optical signal to the first signal modulation module 10, and transmits the fourth optical signal to the second signal modulation module 60.

The second signal modulation module 60 outputs a third combined signal and a fourth combined signal based on the fourth optical signal. The third combined signal corresponds to the second combined signal in the embodiment shown in FIG. 2, and the fourth combined signal corresponds to the first combined signal in the embodiment shown in FIG. 2.

The second PD 70 is configured to perform optical-to-electrical conversion on the fourth combined signal to obtain a second electrical signal. Similarly, the controller 30 may control, based on the second electrical signal, a voltage applied to a phase shifter of the second signal modulation module 60. Specifically, a control manner of the controller is similar to that described in the foregoing embodiment, and details are not described herein again.

The polarization conversion apparatus 80 converts a polarization mode of the second combined signal or the third combined signal, and combines the second combined signal and the third combined signal to obtain a fifth combined signal. For example, original polarization modes of the second combined signal and the third combined signal are transverse electric (TE) polarization. After the second combined signal and the third combined signal are processed by the polarization conversion apparatus 80, the polarization mode of the second combined signal or the third combined signal is converted to transverse magnetic (TM) polarization.

Optionally, types of the first modulator 102 and the second modulator 103 include but are not limited to a micro-ring modulator (MRM), a Mach-Zehnder modulator (MZM), a waveguide-type electro-optic absorption modulator, a Bragg grating modulator, and the like.

Optionally, types of the light source 40 in this embodiment include but are not limited to a distributed feedback laser (DFB), a quantum-dot beam laser, an indium phosphide laser, and the like.

Optionally, the light source 40 may be integrated on a same chip with the first signal modulation module 10 and the second signal modulation module 60. In addition, the light source 40 may also be used as a light source outside the chip. The first PD 20, the second PD 70, the first signal modulation module 10, and the second signal modulation module 60 may be integrated on a same chip. In addition, the first PD 20 and the second PD 70 may alternatively be integrated on a printed circuit board (PCB) with a control circuit. Technologies for integration on the chip include but are not limited to silicon-on-insulator (SOI) integration, lithium niobate thin-film integration, indium phosphide integration, and the like.

Optionally, a coupling manner in which the optical signal emitted by the light source 40 is coupled to the fourth beam splitter 50 and a coupling manner in which the fifth combined signal output by the polarization conversion apparatus 80 is coupled to an optical fiber include but are not limited to side coupling, vertical grating coupling, lens refraction coupling, and the like.

Optionally, types of the polarization conversion apparatus 80 include but are not limited to an inverse polarization splitter and rotator (PSR) and a grating coupler.

Optionally, types of the second beam splitter 104 and the third beam splitter 106 include but are not limited to a multi-mode interferometer (MMI), a Y-branch (Y-branch) beam splitter, and the like.

In embodiments of this application, the coherent transmitter includes modulation of signals on I/Q channels, where some light on the Q channel is used for phase adjustment and coherent modulation with light on the I channel, and other light on the Q channel is used to monitor whether a phase difference obtained after phase adjustment falls within the preset range. If not, the controller may adjust the voltage applied to the phase shift adjustment unit, to adjust the phase difference to the preset range. In such a monitoring and adjustment manner, the phase difference obtained after phase adjustment may be monitored in real time without affecting service transmission, and the phase difference is controlled within the preset range, so that phase adjustment precision is improved, and quality of a coherent signal in coherent modulation is improved. In addition, complex electrical components such as a DAC and an ADC do not need to be disposed in a structure of the coherent transmitter and a method for controlling the coherent transmitter in this solution, so that integration is facilitated, component costs are lower, and power consumption is lower.

Figure 6:
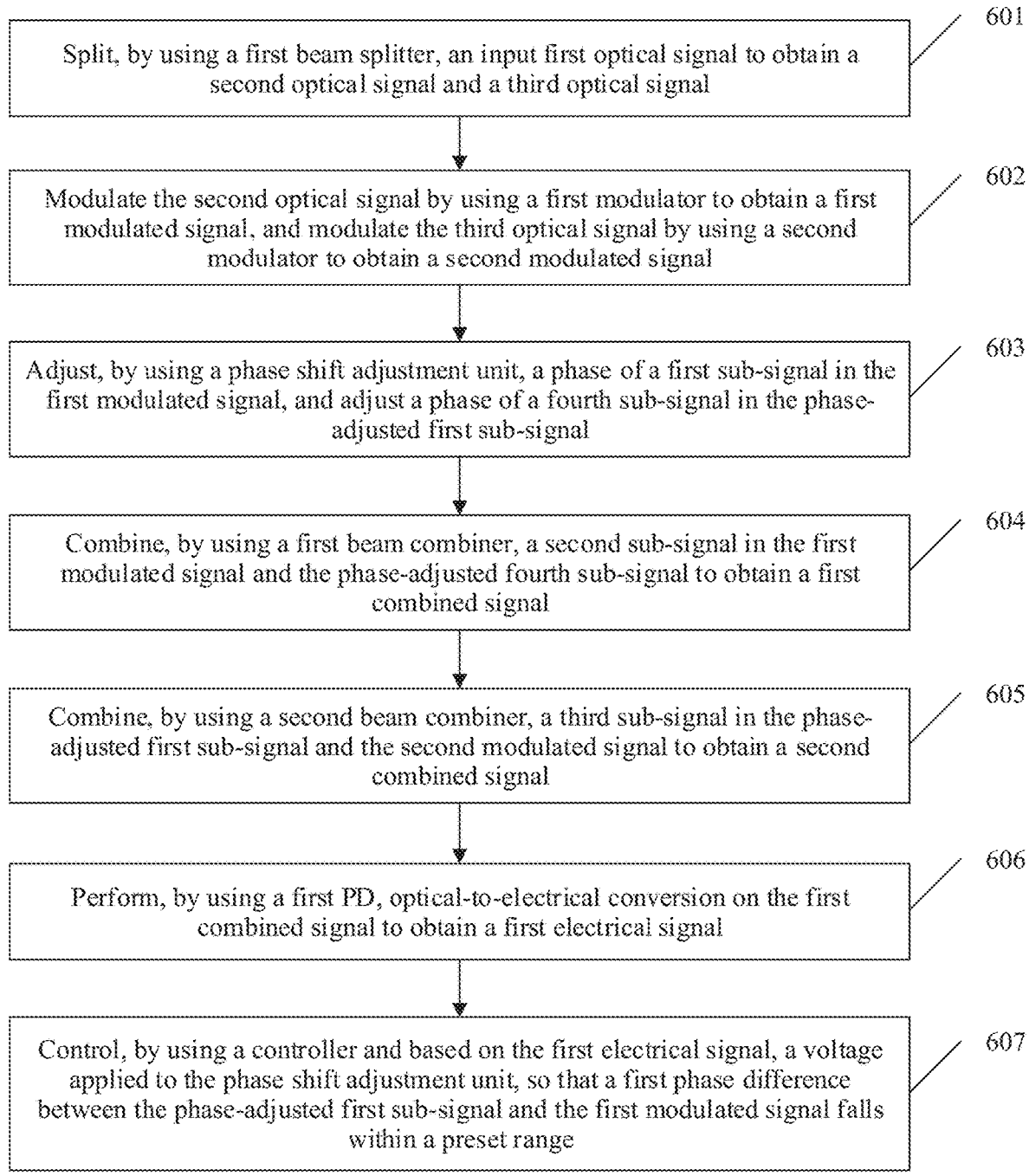
FIG. 6 is a schematic diagram of a method for controlling a coherent transmitter according to an embodiment of this application.

FIG. 6 is a schematic diagram of a method for controlling a coherent transmitter according to an embodiment of this application. The coherent transmitter includes a first signal modulation module, a first photodiode PD, and a controller. The first signal modulation module, the first PD, and the controller are connected to each other. The first signal modulation module includes a first modulator, a second modulator, a first beam splitter, a phase shift adjustment unit, a first beam combiner, and a second beam combiner.

In this example, the method for controlling a coherent transmitter includes the following steps.

601: Split, by using the first beam splitter, an input first optical signal to obtain a second optical signal and a third optical signal.

602: Modulate the second optical signal by using the first modulator to obtain a first modulated signal, and modulate the third optical signal by using the second modulator to obtain a second modulated signal.

In this embodiment, the first modulator and the second modulator have a same structure and a same modulation principle. In addition, the first modulated signal and the second modulated signal have a same phase.

603: Adjust, by using the phase shift adjustment unit, a phase of a first sub-signal in the first modulated signal, and adjust a phase of a fourth sub-signal in the phase-adjusted first sub-signal.

In this embodiment, there is a first phase difference between the phase-adjusted first sub-signal and the first modulated signal, there is a second phase difference between the phase-adjusted fourth sub-signal and the first modulated signal, and the second phase difference is twice as large as the first phase difference.

The phase shift adjustment unit may include a phase shifter, a second beam splitter, and a third beam splitter, where a voltage is applied to the phase shifter. Specifically, the first modulated signal is split by using the second beam splitter to obtain the first sub-signal and the second sub-signal. The phase of the first sub-signal is adjusted by using the phase shifter. The phase-adjusted first sub-signal is split by using the third beam splitter to obtain the third sub-signal and the fourth sub-signal. The phase of the fourth sub-signal is adjusted by using the phase shifter.

604: Combine, by using the first beam combiner, a second sub-signal in the first modulated signal and the phase-adjusted fourth sub-signal to obtain a first combined signal.

605: Combine, by using the second beam combiner, a third sub-signal in the phase-adjusted first sub-signal and the second modulated signal to obtain a second combined signal.

606: Perform, by using the first PD, optical-to-electrical conversion on the first combined signal to obtain a first electrical signal.

607: Control, by using the controller and based on the first electrical signal, a voltage applied to the phase shift adjustment unit, so that the first phase difference between the phase-adjusted first sub-signal and the first modulated signal falls within a preset range.

It should be noted that the coherent transmitter in this embodiment may be the coherent transmitter in any one of the foregoing embodiments shown in FIG. 1 and FIG. 5.

Figure 7:
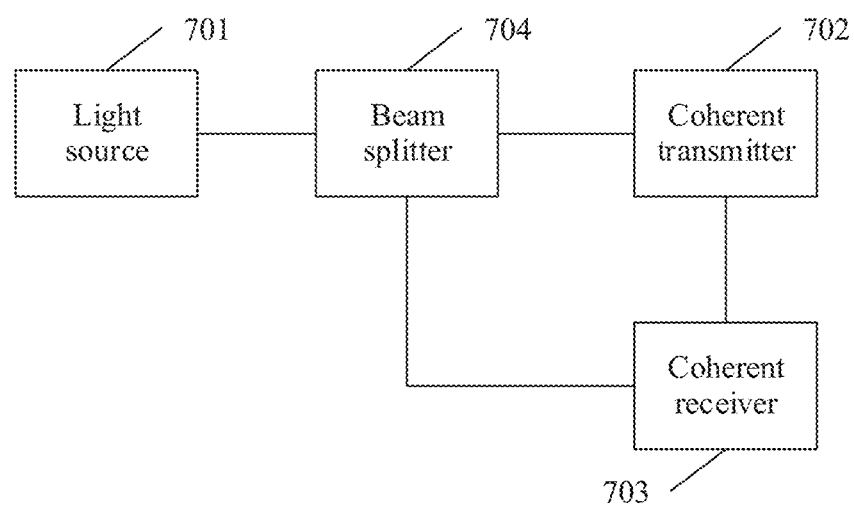
FIG. 7 is a schematic diagram of a structure of a coherent transceiver system according to this application.

FIG. 7 is a schematic diagram of a structure of a coherent transceiver system according to this application. The coherent transceiver system includes a light source 701, a coherent transmitter 702, and a coherent receiver 703. The light source 701 outputs an optical signal. The coherent transmitter 702 outputs a modulated signal. The coherent receiver 703 mixes the optical signal output by the light source 701 with the modulated signal output by the coherent transmitter 702, and demodulates a mixed signal. The coherent transmitter 702 may be the coherent transmitter shown in any one of the embodiments in FIG. 1 and FIG. 5. For function description of the coherent transmitter 702, refer to related descriptions in the foregoing embodiments in FIG. 1 and FIG. 5. Details are not described herein again.

Optionally, the coherent transceiver system further includes a beam splitter 704. The beam splitter splits the optical signal output by the light source 701, to obtain a first optical signal and a second optical signal. The coherent transmitter 702 modulates the first optical signal to obtain a first modulated signal, and outputs the first modulated signal. The coherent receiver 703 mixes the second optical signal and the first modulated signal, and demodulates a mixed signal.

Optionally, a light source used by the coherent transmitter 702 and a light source used by the coherent receiver 703 may be a same light source, or may be different light sources. This is not specifically limited herein.

It should be noted that the foregoing embodiments are merely used to describe the technical solutions of this application, but are not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A coherent transmitter, comprising:
   a first signal modulator, wherein the first signal modulator comprises:
   a first beam splitter, wherein the first beam splitter is configured to split a first optical signal to obtain a second optical signal and a third optical signal;
   a first modulator coupled to the first beam splitter, wherein the first modulator is configured to modulate the second optical signal to obtain a first modulated signal;
   a second modulator coupled to the first beam splitter, wherein the second modulator is configured to modulate the third optical signal to obtain a second modulated signal, and wherein the first modulated signal and the second modulated signal have a same phase;
   a first phase shift adjuster coupled to the first modulator, wherein the first phase shift adjuster is configured to:
   adjust a first phase of a first sub-signal in the first modulated signal, wherein there is a first phase difference between the first sub-signal and the first modulated signal; and
   adjust a second phase of a fourth sub-signal in the first sub-signal, wherein there is a second phase difference between the fourth sub-signal and the first modulated signal, and wherein the second phase difference is twice as large as the first phase difference;
   a first beam combiner coupled to the first phase shift adjuster, wherein the first beam combiner is configured to combine a second sub-signal in the first modulated signal and the fourth sub-signal to obtain a first combined signal; and
   a second beam combiner coupled to the second modulator and the first phase shift adjuster, wherein the second beam combiner is configured to combine a third sub-signal in the first sub-signal and the second modulated signal to obtain a second combined signal;
   a first photodiode (PD) coupled to the first signal modulator, wherein the first PD is configured to perform optical-to-electrical conversion on the first combined signal to obtain a first electrical signal; and
   a controller coupled to the first signal modulator and the first PD, wherein the controller is configured to control, based on the first electrical signal, a first voltage applied to the first phase shift adjuster, to cause the first phase difference to fall within a preset range.

2. The coherent transmitter according to claim 1, wherein the first phase shift adjuster comprises:

a phase shifter, wherein the phase shifter is configured to adjust the first phase and the second phase;
a second beam splitter coupled to the first modulator and the phase shifter, wherein the second beam splitter is configured to split the first modulated signal to obtain the first sub-signal and the second sub-signal; and
a third beam splitter coupled to the phase shifter and the second beam combiner, wherein the third beam splitter is configured to:
split the first sub-signal to obtain the third sub-signal and the fourth sub-signal; and
apply the first voltage to the phase shifter.

3. The coherent transmitter according to claim 1, wherein the coherent transmitter further comprises:
a light source, wherein the light source is configured to output an optical signal;
a second signal modulator, wherein the first signal modulator and the second signal modulator have a same structure, wherein the second signal modulator is configured to output a third combined signal and a fourth combined signal based on a fourth optical signal, and wherein polarization modes of the second combined signal and the third combined signal are transverse electric (TE) polarization;
a second beam splitter coupled to the light source, the first signal modulator and the second signal modulator, wherein the second beam splitter is configured to:
split the optical signal to obtain the first optical signal and the fourth optical signal;
transmit the first optical signal to the first signal modulator; and
transmit the fourth optical signal to the second signal modulator;
a second PD coupled to the second signal modulator and the controller, wherein the second PD is configured to perform optical-to-electrical conversion on the fourth combined signal to obtain a second electrical signal; and
a polarization converter coupled to the first signal modulator and the second signal modulator, wherein the polarization converter is configured to:
combine the second combined signal and the third combined signal to obtain a fifth combined signal; and
convert a polarization mode of the second combined signal or the third combined signal into transverse magnetic (TM) polarization,
wherein the controller is configured to control, based on the second electrical signal, a second voltage applied to a second phase shift adjuster in the second signal modulator.

4. The coherent transmitter according to claim 1, wherein the controller is configured to:
obtain a first current value of the first electrical signal;
increase, when the first current value is greater than a current threshold, the first voltage;
obtain a second current value of the first electrical signal;
increase, when the second current value is less than the first current value and is greater than the current threshold, the first voltage, to obtain that the second current value is less than or equal to the current threshold; and
decrease, when the second current value is greater than the first current value, the first voltage, to obtain that the second current value is less than or equal to the current threshold.

5. The coherent transmitter according to claim 1, wherein the controller is configured to:
obtain a correspondence table, wherein the correspondence table comprises a correspondence between the first voltage and a current value of the first electrical signal;
determine, based on the correspondence table, a target voltage corresponding to a target current value, wherein the target current value is less than or equal to a current threshold; and
adjust the first voltage to the target voltage.

6. The coherent transmitter according to claim 1, wherein a proportion of the second sub-signal in the first modulated signal is a first proportion, wherein a proportion of the fourth sub-signal in the first sub-signal is a second proportion, and wherein a relational formula between the first proportion and the second proportion comprises $(1-x\%) \times y\% = x\%$, where x % represents the first proportion, and y % represents the second proportion.

7. The coherent transmitter according to claim 1, wherein the first modulator and the second modulator are configured for performing one or more modulation methods including amplitude-shift keying (ASK), and wherein the first modulator and the second modulator are micro-ring modulators (MRMs), Mach-Zehnder modulators (MZMs), waveguide-type electro-optic absorption modulators, or Bragg grating modulators.

8. The coherent transmitter according to claim 3, wherein the light source is a distributed feedback laser (DFB), a quantum-dot laser, or an indium phosphide laser, and wherein the polarization converter is an inverse polarization splitter and rotator (PSR) or a grating coupler.

9. The coherent transmitter according to claim 3, wherein the optical signal is coupled to the second beam splitter and the fifth combined signal is coupled to an optical fiber by using side coupling, vertical grating coupling, or lens refraction coupling.

10. The coherent transmitter according to claim 1, wherein the first PD and the first signal modulator are integrated on an optical chip by using silicon-on-insulator (SOI) integration, lithium niobate thin-film integration, or indium phosphide integration, or the first PD and the controller are integrated on a printed circuit board (PCB).

11. A method for controlling a coherent transmitter, wherein the method comprises:
splitting, using a first beam splitter, a first optical signal to obtain a second optical signal and a third optical signal;
modulating, using a first modulator, the second optical signal to obtain a first modulated signal;
modulating, using a second modulator, the third optical signal to obtain a second modulated signal, wherein the first modulated signal and the second modulated signal have a same phase;
adjusting, using a phase shift adjuster, a first phase of a first sub-signal in the first modulated signal;
adjusting, using the phase shift adjuster, a second phase of a fourth sub-signal in the first sub-signal, wherein there is a first phase difference between the first sub-signal and the first modulated signal and a second phase difference between the fourth sub-signal and the first modulated signal, and wherein the second phase difference is twice as large as the first phase difference;
combining, using a first beam combiner, a second sub-signal in the first modulated signal and the fourth sub-signal to obtain a first combined signal;

combining, using a second beam combiner, a third sub-signal in the first sub-signal and the second modulated signal to obtain a second combined signal;

performing, using a first photodiode (PD), optical-to-electrical conversion on the first combined signal to obtain a first electrical signal; and controlling, using a controller and based on the first electrical signal, a first voltage applied to the phase shift adjuster, to cause the first phase difference between the first sub-signal and the first modulated signal to fall within a preset range.

12. The method according to claim 11, wherein the method further comprises:

splitting, using a second beam splitter of the phase shift adjuster, the first modulated signal to obtain the first sub-signal and the second sub-signal;

adjusting, using a phase shifter of the phase shift adjuster, the first phase;

splitting, using a third beam splitter of the phase shift adjuster, the first sub-signal to obtain the third sub-signal and the fourth sub-signal; and adjusting, using the phase shifter, the second phase.

13. A coherent transceiver system, comprising:

a light source configured to output an optical signal;

a coherent transmitter coupled to the light source and configured to output a modulated signal, wherein the coherent transmitter comprises:

a first signal modulator, wherein the first signal modulator comprises:

a first beam splitter, wherein the first beam splitter is configured to split a first optical signal to obtain a second optical signal and a third optical signal;

a first modulator coupled to the first beam splitter, wherein the first modulator is configured to modulate the second optical signal to obtain a first modulated signal;

a second modulator coupled to the first beam splitter, wherein the second modulator is configured to modulate the third optical signal to obtain a second modulated signal, and wherein the first modulated signal and the second modulated signal have a same phase;

a first phase shift adjuster coupled to the first modulator, wherein the first phase shift adjuster is configured to:

adjust a first phase of a first sub-signal in the first modulated signal, wherein there is a first phase difference between the first sub-signal and the first modulated signal; and adjust a second phase of a fourth sub-signal in the first sub-signal, wherein there is a second phase difference between the fourth sub-signal and the first modulated signal, and wherein the second phase difference is twice as large as the first phase difference;

a first beam combiner coupled to the first phase shift adjuster, wherein the first beam combiner is configured to combine a second sub-signal in the first modulated signal and the fourth sub-signal to obtain a first combined signal; and a second beam combiner coupled to the second modulator and the first phase shift adjuster, wherein the second beam combiner is configured to combine a third sub-signal in the first sub-signal and the second modulated signal to obtain a second combined signal, and wherein the modulated signal is the second combined signal;

a first photodiode (PD) coupled to the first signal modulator, wherein the first PD is configured to perform optical-to-electrical conversion on the first combined signal to obtain a first electrical signal; and a controller coupled to the first signal modulator and the first PD, wherein the controller is configured to control, based on the first electrical signal, a first voltage applied to the first phase shift adjuster, to cause the first phase difference to fall within a preset range; and a coherent receiver coupled to the coherent transmitter, wherein the coherent receiver is configured to:

mix the optical signal and the modulated signal to obtain a first mixed signal; and demodulate the first mixed signal.

14. The coherent transceiver system according to claim 13, wherein the coherent transceiver system further comprises a second beam splitter, wherein the second beam splitter is configured to split the optical signal to obtain the first optical signal and a fourth optical signal, and wherein the coherent receiver is configured to:

mix the fourth optical signal and the modulated signal to obtain a second mixed signal; and demodulate the second mixed signal.

15. The coherent transceiver system according to claim 13, wherein the first phase shift adjuster comprises:

a phase shifter, wherein the phase shifter is configured to adjust the first phase and the second phase;

a second beam splitter coupled to the first modulator and the phase shifter, wherein the second beam splitter is configured to split the first modulated signal to obtain the first sub-signal and the second sub-signal; and a third beam splitter coupled to the phase shifter and the second beam combiner, wherein the third beam splitter is configured to:

split the first sub-signal to obtain the third sub-signal and the fourth sub-signal; and apply the first voltage to the phase shifter.

16. The coherent transceiver system according to claim 13, wherein the coherent transmitter further comprises:

a second signal modulator, wherein the first signal modulator and the second signal modulator have a same structure, wherein the second signal modulator is configured to output a third combined signal and a fourth combined signal based on a fourth optical signal, and wherein polarization modes of the second combined signal and the third combined signal are transverse electric (TE) polarization;

a second beam splitter coupled to the light source, the first signal modulator and the second signal modulator, wherein the second beam splitter is configured to:

split the optical signal to obtain the first optical signal and the fourth optical signal;

transmit the first optical signal to the first signal modulator; and transmit the fourth optical signal to the second signal modulator;

a second PD coupled to the second signal modulator and the controller, wherein the second PD is configured to perform optical-to-electrical conversion on the fourth combined signal to obtain a second electrical signal; and a polarization converter coupled to the first signal modulator and the second signal modulator, wherein the polarization converter is configured to:

combine the second combined signal and the third combined signal to obtain a fifth combined signal; and convert a polarization mode of the second combined signal or the third combined signal into transverse magnetic (TM) polarization, wherein the controller is configured to control, based on the second electrical signal, a second voltage applied to a second phase shift adjuster of the second signal modulator.

17. The coherent transceiver system according to claim 13, wherein the controller is configured to:

obtain a first current value of the first electrical signal;

increase, when the first current value is greater than a current threshold, the first voltage;

obtain a second current value of the first electrical signal;

increase, when the second current value is less than the first current value and is greater than the current threshold, the first voltage, to obtain that the second current value is less than or equal to the current threshold; and decrease, when the second current value is greater than the first current value, the first voltage, to obtain that the second current value is less than or equal to the current threshold.

18. The coherent transceiver system according to claim 13, wherein the controller is configured to:

obtain a correspondence table, wherein the correspondence table comprises a correspondence between the first voltage and a current value of the first electrical signal;

determine, based on the correspondence table, a target voltage corresponding to a target current value, wherein the target current value is less than or equal to a current threshold; and adjust the first voltage to the target voltage.

19. The coherent transceiver system according to claim 13, wherein a proportion of the second sub-signal in the first modulated signal is a first proportion, wherein a proportion of the fourth sub-signal in the first sub-signal is a second proportion, and wherein a relational formula between the first proportion and the second proportion comprises (1−x %)×y %=x %, where x % represents the first proportion, and y % represents the second proportion.

20. The coherent transceiver system according to claim 13, wherein the first modulator and the second modulator are configured for performing one or more modulation methods including amplitude shift keying (ASK), and wherein the first modulator and the second modulator are micro-ring modulators (MRMs), Mach-Zehnder modulators, waveguide-type electro-optic absorption modulators, or Bragg grating modulators.

* * * * *